Figure 1:
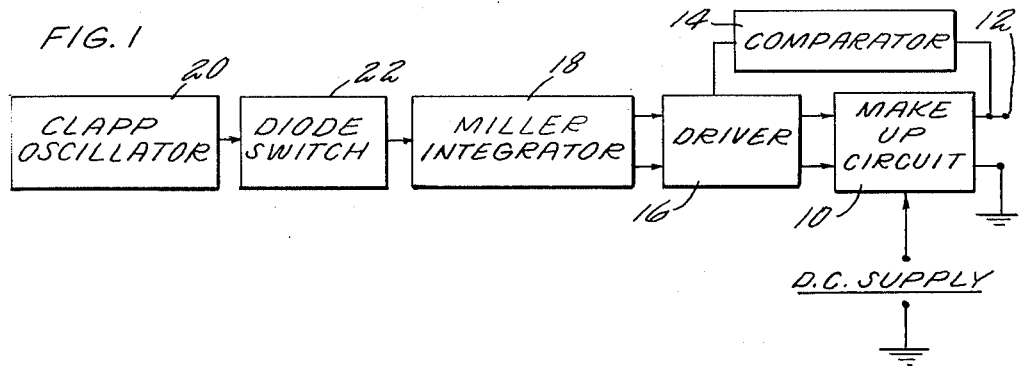

Nov. 9, 1965 B. E. HART 3,217,230
REGULATED D.C. CONVERTER OUTPUT STAGE
Filed Sept. 4, 1962

INVENTOR
BURT E. HART
BY Roy A. Van Kirk
AGENT

United States Patent Office 3,217,230
Patented Nov. 9, 1965

3,217,230
REGULATED D.C. CONVERTER OUTPUT STAGE
Burt E. Hart, Rockville, Conn., assignor to United Aircraft Corporation, East Hartford, Conn., a corporation of Delaware
Filed Sept. 4, 1962, Ser. No. 220,986
3 Claims. (Cl. 321—2)

My invention relates to an output stage for a static converter. More particularly, my invention is directed to a voltage make-up regulator which prevents the direct current output voltage of a source such as a static converter from dropping below a desired level regardless of fluctuations in the supply voltage.

In missile, nautical and automotive applications it is necessary that the static converters utilized to provide, from battery sources, the necessary higher and extremely well regulated D.C. output voltage be compact and be able to withstand severe vibrational stresses. The voltage regulator circuits employed in prior art static converters have largely employed vacuum tube voltage regulators. These converters suffered from the disadvantages of relatively large size and weight and, when subjected to severe vibrations, the vacuum tubes utilized were either torn apart internally or jarred from their sockets. Further, and more important, in order to make up for drops in the supply voltage, the circuits available in the prior art converted all the power supplied to the load. This, of course, greatly diminished the efficiency of the circuits and required the use of components having higher power ratings with their corresponding larger sizes and weights.

My invention overcomes the disadvantages of the prior art by providing a novel voltage make-up regulator for a static converter.

It is therefore an object of my invention to regulate the output voltage of a source such as a static converter.

It is another object of my invention to prevent a D.C. output voltage from decreasing below a desired value regardless of changes in the supply voltage.

It is yet another object of my invention to generate D.C. potentials that will make up for drops in the voltage from a D.C. source and will, when combined with the source voltage, produce a constant output voltage.

It is also an object of my invention to provide a more efficient voltage make-up circuit than available in the prior art.

It is a further object of my invention to make up for drops in the voltage supplied to a load in such a manner that only a portion of the power supplied by the source is converted.

It is another object of my invention to limit the rise of voltage across an opening switch to the supply voltage except at the lowest input voltage, thereby minimizing the power dissipated as the switch opens.

It is still another object of my invention to provide simple, inexpensive, lightweight, and reliable circuitry to accomplish the other objects of my invention.

These and other objects of my invention are accomplished by a novel voltage make-up regulator. The heart of this regulator is a make-up circuit employing a center tapped auto-transformer. A voltage to be controlled is applied to the center tap of the transformer and, through diodes spaced equally on opposite sides of the center tap, to a load circuit through a smoothing filter. Alternate switching pulses, the width of which are controlled by the magnitude of the voltage to be made up, are applied to normally open switches connected to opposite ends of the transformer only when the load voltage decreases below the desired value. The alternate closing of the switches results in current flow through the switching circuits which in turn increases total current flow through alternate halves of the transformer winding and thus causes a voltage to be induced in the opposite half of the winding. This induced voltage is combined with the source voltage and results in the voltage applied to the load circuit being maintained at its previous level even though the source voltage decreases.

Figure 2:
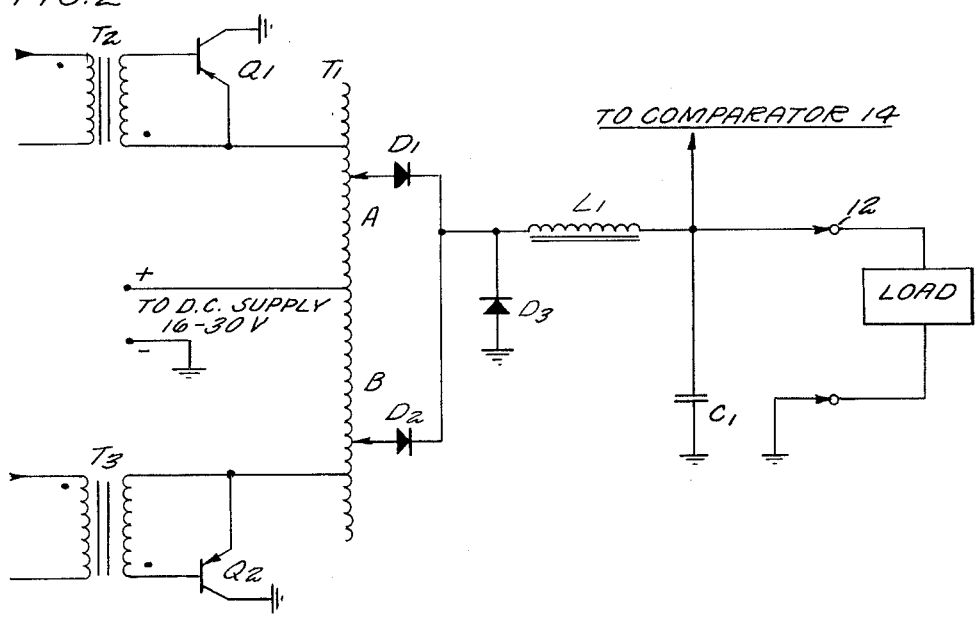

My invention may be better understood and its numerous advantages will become apparent to those skilled in the art by reference to the accompanying drawing in which:

FIGURE 1 shows a block diagram of the make-up regulator comprising my invention.
FIGURE 2 is a schematic drawing of a novel voltage make-up circuit utilized in the regulator of FIGURE 1.

Referring now to FIGURE 1, the D.C. supply voltage, which may be furnished by a static converter and which is subject to variations, is supplied to a make-up circuit 10. As will be explained below in regards to FIGURE 2, this D.C. supply voltage will be passed through the make-up circuit 10 and will appear on output terminal 12. The output of circuit 10 is also supplied to a voltage comparator circuit 14 which may use a Zener diode for establishing a reference voltage level in a manner well known in the art. The output of comparator 14 will be a D.C. current, the magnitude of which varies directly with the difference between the voltage at terminal 12 and the reference level as established by the Zener diode. The output of the comparator 14 is applied to a push-pull driver circuit 16. Also applied to driver circuit 16 is a symmetrical sawtooth voltage generated by a Miller integrator 18. This symmetrical sawtooth voltage may be produced by various circuits known in the art. However, in my preferred embodiment, a free running Clapp oscillator 20 supplies a sine wave at the desired frequency to drive a diode switch 22. The switch 22 furnishes a series of pulses to integrator 18 which generates the symmetrical sawtooth voltage referred to above in a manner well known in the art.

The current from comparator 14 is used to generate a bias voltage for driver 16. The sum of the bias voltage and the applied sawtooth voltage will control the point along the ramp of the sawtooth voltage at which the driver will conduct and thus pass a pulse to make-up circuit 10. Therefore, the duration or width of the pulses supplied to circuit 10 is directly proportional to the magnitude of the signal generated by comparator 14 and is thus directly proportional to the difference between the actual and desired output voltages.

Referring now to FIGURE 2, the circuitry of make-up circuit 10 is shown in detail. This circuit consists of two switching devices Q1 and Q2, a symmetrically wound auto-transformer T1, diodes D1 through D3 and a filter circuit comprised of inductor L1 and capacitor C1. The switching devices Q1 and Q2 are preferably transistors, as shown, but may be any other device capable of performing the same switching function. The circuit functions in the manner to be described below so as to maintain the voltage at output terminal 12 at the desired level regardless of changes in the D.C. voltage which is supplied to the center tap of the transformer T1. During the periods when the output voltage is at the desired level neither Q1 nor Q2 will be conducting and current will flow from the D.C. input supply, through the two halves A and B of transformer T1, through diodes D1 and D2 and thence through the inductor L1 to the load and back to the D.C. supply.

When the voltage at output terminal 12 drops below the desired level, the push-pull driver 16 will be biased by the output current from comparator 14, in the manner described above, so as to pass pulses to circuit 10. The push-pull connection of driver 16 causes these pulses to be alternately applied to the primary windings of transformers T2 and T3 and thus switches Q1 and Q2 are alternately turned on and off at a constant frequency controlled by the frequency of oscillator 20. The period that each switch is turned on is controlled by the width of the pulses which is itself controlled in the manner described above, by the bias voltage generated by the current from comparator 14. The time the switches are on is thus a function of the voltage to be "made up." When Q1 is conducting, the supply voltage is dropped across the half of the winding of transformer T1 labeled A inducing a voltage across the other half of the winding labeled B. Current then flows from the D.C. supply through half B of the winding of transformer T1, diode D2, inductor L1, and charges capacitor C1 to a potential greater than that to which it would be charged if neither Q1 nor Q2 were conducting. That is, capacitor C1 charges up to a potential greater than the load voltage which has fallen below the desired level. When alternate pulses are received from driver 16, Q2 will be cut off. Under these conditions a similar situation exists with current flowing from the supply through half A of the winding of transformer T1 and diode D1 to the filter circuit. Thus the alternate closing of the switches results in increasing total current flow through alternate halves of the transformer winding and the current flow in one half of the winding causes a voltage to be induced in the opposite half of the winding. This induced voltage is combined with the source voltage and results in the voltage applied to the load circuit being maintained at its previous level.

The filter circuit comprising inductor L1 and capacitor C1 provides a long time constant at the frequency at which switches Q1 and Q2 are being turned on and off. Thus, when either Q1 or Q2 ceases to conduct, inductor L1 attempts to maintain the current at a constant value and consequently tends to maintain the charge on capacitor C1 and accordingly, to maintain the voltage across the load at its previous level. Also, when either of the switches is turned off, the voltage at that side of transformer T1 rises and tends to pull current through the open switch. When this reverse voltage rises above the supply voltage, D1 or D2, respectively, conducts thereby preventing the voltage from rising further. Thus, for pulse widths less than one half the period of the oscillator frequency, the voltage across the opening switch does not rise above the supply voltage. Since the voltage across an opening switch is limited to the supply voltage, the power dissipated as the switch opens is minimized. Further, by causing the amount of switch power to be less than the total output power from the source, the circuit only converts an amount of power necessary to make up the line voltage to a desired level.

Clamping diode D3 prevents damage to switches Q1 and Q2 when the supply voltage is turned off. When the supply voltage is turned off, the voltage at the line side of transformer T1 rises and attempts to pull current through switches Q1 and Q2 in the reverse direction. However, since switches Q1 and Q2 are switching from ground, diode D3 acts as a shunt across the switches and thus prevents damage through reverse current.

From the above description it can be seen that my invention possesses certain characteristics and advantages. Thus, an output voltage equal to the supply voltage less the voltage drop across T1, diodes D1 and D2, and inductor L1 appears across the load even though neither of switches Q1 and Q2 is conducting. Also, no damper diode is required across inductor L1 since diodes D1 and D2 provide a conduction path through transformer T1 even though neither of the switches is conducting. The voltage across the switch elements Q1 and Q2 can become no greater than the supply voltage during either the opening or closing of either of the switches. Finally, since the disclosed make-up circuit does not convert all of the power delivered to the load, the switch elements Q1 and Q2 are not required to handle all of such power.

Thus my invention is described by way of illustration rather than limitation and accordingly it is understood that my invention is to be limited only by the appended claims taken in view of the prior art.

I claim:
1. A voltage make-up circuit comprising:
   an auto transformer having a center tap and a plurality of oppositely disposed voltage taps thereon;
   a D.C. voltage supply;
   means connecting a first polarity terminal of said supply to the center tap of said transformer;
   a pair of output terminals adapted to be connected to opposite ends of a load;
   means connecting a first one of said terminals to the second polarity terminal of said supply;
   means coupling a pair of intermediate voltage taps on said transformer to the second one of said terminals, said intermediate taps being equally but oppositely disposed with the relation to said center tap, whereby a complete circuit for the flow of direct current from said source to a load independent of any means not normally conductive is provided;
   means for generating a reference voltage corresponding to the desired load voltage and for comparing the voltage across said output terminals with said reference voltage to generate a signal commensurate with the difference therebetween;
   means for generating variable width switching pulses;
   means for applying said signal commensurate with the difference between the actual and desired load voltages to said pulse generating means whereby pulses will be generated only when the desired and actual load voltages differ, the width of said pulses being controlled by the magnitude of said difference signal;
   first normally open switch means connected between a first end tap on said transformer and the second polarity terminal of said supply;
   second normally open switch means connected between the second end tap on said transformer and the second polarity terminal of said supply; and
   means alternately applying the switching pulses from said pulse generating means to said first and second switch means whereby said switch means will alternately be closed and an alternating current will flow in said transformer only when the load voltage deviates from its desired value, said alternating current inducing a voltage in said transformer that may be added to the load voltage to make up the difference between the actual and desired load voltages.

2. The apparatus of claim 1 wherein the means coupling the intermediate taps to the second of said output terminal comprises:
   means connected to said pair of intermediate voltage taps for rectifying the alternating voltage induced in said transformer when said switch means are alternately closed.

3. The apparatus of claim 2 further comprising:
   means connected between said rectifying means and the second of said terminals for removing any alternating component from the D.C. voltage produced by said rectifying means.

References Cited by the Examiner
UNITED STATES PATENTS

| 2,806,963 | 9/57 | Woll | 323—22 X |
| 2,964,717 | 12/60 | Carstedt et al. | 321—2 |
| 2,991,410 | 7/61 | Seike | 321—2 |

LLOYD McCOLLUM, *Primary Examiner.*